Patented June 28, 1932

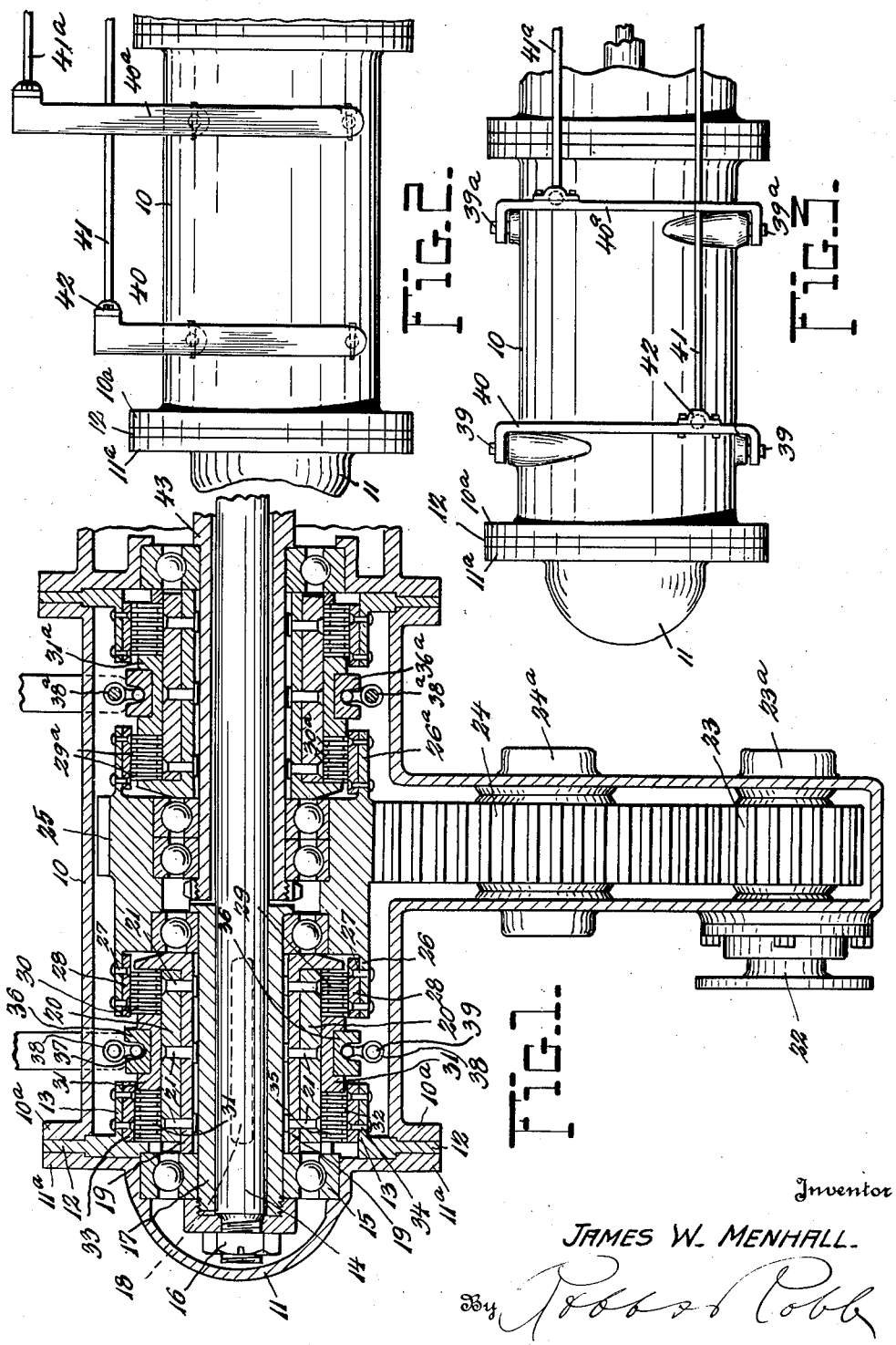

1,865,129

UNITED STATES PATENT OFFICE

JAMES W. MENHALL, OF EDGERTON, WISCONSIN, ASSIGNOR TO HIGHWAY TRAILER COMPANY, OF EDGERTON, WISCONSIN, A CORPORATION

CLUTCH BRAKE

Application filed February 13, 1931. Serial No. 515,586.

The present invention relates to a driving mechanism for power operated machines, and relates more specifically to a combined clutch and brake mechanism operating upon certain driving elements of the construction, the clutch and brake being simultaneously operable, so that when the clutch member is engaged for power transmission, the brake member will be simultaneously released, and vice versa.

The invention further contemplates the mounting of the driving mechanism so that it will continuously operate in a bath of suitable lubricant, such as oil.

The invention also provides independently operable driving units for operating separate driven elements each driving unit comprising a conventional type of disk clutch and a brake having substantially the construction of the usual disk clutch, except that alternate disks are held rigidly against rotation. Each of the driving units is arranged to transmit motion to the driven elements from a source of power common to the driving units, communication therewith being had through the above mentioned clutch instrumentalities.

The invention will be more readily understood by referring to the accompanying drawing, in which:—

Figure 1 is a vertical section through a housing containing a driving system constructed in accordance with the present invention.

Figure 2 is a side elevation of the exterior of the housing, showing the operating connections for the clutch and brake mechanism; and, Figure 3 is a top view of the housing, taken at ninety degrees to Figure 2.

Referring to the drawing, the housing 10 is illustrated as being provided with a head 11, the housing 10 and head 11 being provided with cooperating shoulders 10a and 11a respectively, between which shoulders is positioned an angle member 12, this member being formed in the shape of a right angle, one side of which projects inwardly within the housing parallel to the casing 10, and is designated as 13. This member 12 is, therefore, seen to be rigidly and immovably secured between the shoulders 10a and 11a.

The driving mechanism is enclosed in the housing 10, and comprises the shaft 14 mounted in a suitable bearing member 15, and secured thereto in suitable manner as by a nut 16. Surrounding the shaft 14, which shaft is freely rotative, is the sleeve 17, which is secured to the shaft for rotation therewith in any suitable manner, as for instance, a key 18. Rigidly secured to the sleeve 17 for rotation therewith is the rotary member indicated at 19, the member 19 having the member 20 bolted or riveted thereto by bolts or rivets 21, the drawing showing that these bolts or rivets serve as keys for securing the member 19 in engagement with the sleeve 17.

For transmitting motion to the shaft 14 from a source of power, not shown, there is illustrated a power shaft 22 terminating in a gear 23, which meshes with the gear 24, the gears 23 and 24 operating on bearings 23a and 24a respectively, the gear 24 further meshing with the gear 25, from which gear motion is transmitted to the shaft 14, the gear 25 thereby being a source of power common to the two units.

As will be seen from the drawing, the gear 25 is provided with a shoulder or flange portion 26, this flange portion having secured to it by rivets 27 a ring member 28 which carries a series of spaced clutch members 29, which are conveniently disk members, between which are positioned corresponding members 30 which are carried by the member 20, the clutch members 29 and 30 being brought into engagement by the member 31 which is rotative with the member 20, but slidable thereon so that upon actuation the disks 29 and 30 will be brought into frictional engagement with each other for imparting rotation from the gear 25 to the sleeve 17 and shaft 14, it being understood that the gear 25 continuously rotates, and when the clutch disks 29 and 30 are brought into frictional engagement, the members 31, 20 and 19 are also rotated with the gear 25 to drive the sleeve 17 and shaft 14.

The member 31, therefore, acts as a clamping member, to produce selective engagement and disengagement of the clutch disks 29 and 30, when the member 31 is correspondingly moved along the member 20.

The actuation of the member 31 to release the clutch disks 29 and 30 may be utilized for the application of a braking force to stop the rotation of the shaft 14, the braking force being applied simultaneously with the disengagement of the clutch disks 29 and 30.

To effect this braking action, there is provided a brake very similar in construction to the clutch member just described, except that one of the series of spaced disks is immovably secured to a member riveted to the flange 13 of the member 12, the intermediate disks being carried by the member 20 as previously described in connection with the clutch member. As shown, the immovable disks indicated at 32 are carried by a ring 33 clamped to the flange 13 by rivets 34. It will be obvious that when the rotating disks 35 are brought into frictional engagement with the fixed disks 32, the friction thus produced will stop the rotation of the disks 35 and therefore brake the motion of the shaft 14.

To actuate the sliding member 31, there is provided a recess extending peripherally around the member 31, within which recess is fitted the ring member 36, grooved as indicated at 37 to receive the actuating member 38, which fits into the groove 37 and which is turnable with the shaft 39. In order to assume smooth operation, it is desirable to duplicate the actuating members 38, and placing them diametrically opposite each other as indicated on the drawing; in this way, there will be avoided any tendency of the member 31 to bind or catch during its operation. Each of these members 38 is mounted on a separate shaft, indicated at 39, which shafts enter the housing 10 through oil-tight bearings, and are actuated by a yoke 40, see Figures 2 and 3, which yoke is in turn actuated through the rod 41 connected thereto at the universal joint 42.

It may be here mentioned that the brake member described above, is substantially the same in construction as the clutch member above described, and which is the usual form of disk clutch. To form the brake, the clutch elements 32 are simply immovably riveted to the bracket 13, which is rigidly clamped, as shown at 12, between the shoulders 10a and 11a of the housing 10, and head 11, respectively.

There is also shown in Figure 1, a clutch and brake mechanism which is the exact duplicate of that described above for driving and breaking the hollow shaft 43, which surrounds the shaft 14, but is independently rotative thereof. It is accordingly unnecessary to describe in detail this clutch and brake mechanism beyond pointing out the fact that the disks 29a are carried by the shoulder 26a of the gear 25, the shoulder 26a and disks 29a corresponding to the shoulder 26 and disks 29, previously described, while the cooperating disks 30a correspond to the disks 30 previously mentioned and are carried by the member 20a corresponding in all details to the member 20, actuation of the clutch member being brought through the frictional engagement of the disks 29a and 30a through pressure exerted upon them by the actuation of the slidable member 31a, corresponding to the previously described member 31.

The clutch and brake members of this right-hand unit are, as mentioned above, substantial duplicates of the construction of the left hand unit, actuation thereof being accomplished through the sliding of the member 31a, corresponding to the member 31, by force transmitted thereto from pressure exerted on the grooved ring 36a through the duplicated members 38a corresponding to the members 38, these members 38a operating on duplicate shafts 39a operated by the fork or yoke 40a which is in turn actuated by operation of the rod 41a. The housing 10 is adapted to contain a pool of oil so that all revolving parts will be immersed in lubricant.

It will be, therefore, observed that there is provided by this invention, a novel brake construction which is combined and simultaneously operative with a clutch device so that when the clutch device is engaged for transmission of motion, the brake will be released, and contrarily, when the brake is applied, the clutch member is released simultaneously, the clutch and brake being of substantially the same construction, as heretofore mentioned, except that in the brake alternate elements or disks are held against rotation.

The construction of this invention results in a very compact mechanism which permits ease of assembly and operation of multiple driving and driven elements taking power from a common source, the independent units being capable of full independent action; thus, while the two clutch and brake units herein illustrated are substantially duplicates of each other and each takes its power from the gear 25 as the source, it will be apparent that the two units are independently operative as separate assemblies and drive their own mechanisms independently of each other.

It will also be understood that various this art; it will, therefore, be understood may be made without departing from the inventive concept and that such changes will readily suggest themselves to one skilled in this art; it will, therefore, be understood that it is intended and desired to embrace within the scope of this invention, such modifications and changes as may be necessary to adapt it to varying conditions and uses.

Having thus described my invention, what

I claim as new and desire to secure by Letters Patent of the United States, is:—

1. In a mechanism of the class described, in combination, an oil tight housing for containing a pool of lubricant, a main shaft and a hollow shaft surrounding the main shaft, each shaft being driven by a power source within the housing and dual drive instrumentalities within the housing for transmitting movement from the power source to the main and hollow shafts, respectively, each drive instrumentality comprising a unit carrying clutch and brake members for controlling the movement of the respective shafts, the clutch member being adapted to be brought into and out of operative engagement with the power source and the brake member comprising cooperating brake elements carried by the unit and by the housing, respectively, and means for independently and selectively controlling either unit for correspondingly controlling the operation of either shaft independently of the other, the actuation of clutch members producing opposite actuation of the corresponding brake members, and vice versa.

2. In a mechanism of the class described, in combination, a housing, a main shaft within the housing and projecting from one side thereof, and a hollow shaft surrounding the main shaft and extending from the housing at the same side as the main shaft, a source of power within the housing common to the two shafts, and dual drive instrumentalities within the housing for transmitting movement from the power source to the main and hollow shafts respectively, each drive instrumentality comprising a unit carrying clutch and brake members for controlling the movement of the respective shafts, each drive instrumentality further comprising a sleeve keyed to the respective shafts, the said clutch member being adapted to be brought into and out of operative engagement with the power source, and the brake member comprising cooperating brake elements carried by the said unit and by the housing respectively, and means for independently and selectively controlling either unit for correspondingly controlling the operation of either shaft independently of the other, the actuation of the clutch members producing opposite actuation of the corresponding brake members, and vice versa.

3. In a mechanism of the class described, in combination, a housing, a main shaft and a hollow shaft surrounding the main shaft, the shafts extending from the same side of the housing, a power source within the housing for driving each shaft, and dual drive instrumentalities within the housing for transmitting movement from the power source to the main and hollow shafts respectively, each drive instrumentality comprising a unit carrying clutch and brake members for controlling the movement of the respective shafts, the clutch member being adapted to be brought into and out of operative engagement with the power source, and the brake member comprising cooperating brake elements carried by the unit and by the housing, respectively, one of the said units comprising also a sleeve secured to the main shaft, the other drive unit comprising also a sleeve secured to the hollow shaft, and means for independently and selectively controlling either unit for correspondingly controlling the operation of either shaft independently of the other, the actuation of the clutch members producing opposite actuation of the corresponding brake members, and vice versa.

4. In a mechanism of the class described, in combination, a housing, a main shaft and a hollow shaft surrounding the main shaft within the housing and extending through a side thereof, each shaft being driven by a power source within the housing, and dual drive instrumentalities within the housing for transmitting movement from the power source to the main and hollow shafts respectively, each drive instrumentality comprising a unit carrying clutch and brake members for controlling the movement of the respective shafts, the clutch member being adapted to be brought into and out of operative engagement with the power source, and the brake member comprising cooperating brake elements carried by the unit and by the housing, respectively, and means for independently and selectively controlling either unit for correspondingly controlling the operation of either shaft independently of the other, the actuation of the clutch members producing opposite actuation of the corresponding brake members, and vice versa.

In testimony whereof I affix my signature.

JAMES W. MENHALL.